United States Patent
Lee et al.

(10) Patent No.: US 8,321,876 B2
(45) Date of Patent: Nov. 27, 2012

(54) SYSTEM AND METHOD OF DYNAMICALLY LOADING AND EXECUTING MODULE DEVICES USING INTER-CORE-COMMUNICATION CHANNEL IN MULTICORE SYSTEM ENVIRONMENT

(75) Inventors: Kwang Yong Lee, Daejeon (KR); Dong Hwan Kim, Daejeon (KR); Dong Wook Kang, Daejeon (KR); Jae Myoung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1094 days.

(21) Appl. No.: 12/142,714

(22) Filed: Jun. 19, 2008

(65) Prior Publication Data

US 2009/0158297 A1 Jun. 18, 2009

(30) Foreign Application Priority Data

Dec. 12, 2007 (KR) .................. 10-2007-0128988

(51) Int. Cl.
*G06F 9/44* (2006.01)
(52) U.S. Cl. .................. 719/314; 719/318
(58) Field of Classification Search .................. 719/310, 719/314, 318
See application file for complete search history.

(56) References Cited

U.S. PATENT DOCUMENTS

| | | | | |
|---|---|---|---|---|
| 5,689,713 A * | 11/1997 | Normoyle et al. | ............ | 710/263 |
| 5,761,429 A * | 6/1998 | Thompson | ............ | 709/224 |
| 5,838,913 A * | 11/1998 | Lysejko et al. | ............ | 709/208 |
| 6,601,186 B1 * | 7/2003 | Fox et al. | ............ | 714/4.12 |
| 6,654,903 B1 * | 11/2003 | Sullivan et al. | ............ | 714/4.12 |
| 6,708,291 B1 * | 3/2004 | Kidder | ............ | 714/39 |
| 7,216,348 B1 | 5/2007 | deCarmo | | |
| 7,392,288 B2 * | 6/2008 | Ooi et al. | ............ | 709/205 |
| 7,404,041 B2 * | 7/2008 | Gara et al. | ............ | 711/121 |
| 7,587,465 B1 * | 9/2009 | Muchow | ............ | 709/209 |
| 7,647,383 B1 * | 1/2010 | Boswell et al. | ............ | 709/207 |
| 7,702,739 B1 * | 4/2010 | Cheng et al. | ............ | 709/207 |
| 7,856,480 B2 * | 12/2010 | Muchow | ............ | 709/208 |
| 8,020,163 B2 * | 9/2011 | Nollet et al. | ............ | 718/104 |
| 2002/0133552 A1 * | 9/2002 | Ooi et al. | ............ | 709/205 |
| 2004/0078799 A1 * | 4/2004 | Koning et al. | ............ | 719/313 |
| 2004/0123201 A1 * | 6/2004 | Nguyen et al. | ............ | 714/736 |
| 2005/0203988 A1 * | 9/2005 | Nollet et al. | ............ | 709/201 |
| 2006/0277533 A1 * | 12/2006 | Fiske | ............ | 717/137 |
| 2007/0192545 A1 * | 8/2007 | Gara et al. | ............ | 711/141 |
| 2007/0288668 A1 * | 12/2007 | Fiske | ............ | 710/100 |

FOREIGN PATENT DOCUMENTS

| | | |
|---|---|---|
| KR | 10-2007-0022034 A | 2/2007 |
| KR | 10-2007-0037427 A | 4/2007 |
| KR | 10-2007-0083590 A | 8/2007 |
| KR | 1020070090649 A | 9/2007 |

* cited by examiner

*Primary Examiner* — Van Nguyen (57) ABSTRACT

Provided are a system and method for allocating a specific job or application to a specific slave core by using an inter-core-communication (ICC) channel and executing the job or application in a multicore system environment including the master core and a plurality of slave cores. The method of a master core, includes: initializing message transmission times; generating an event for processing a instruction received from an application program and generating a channel event message from the event; checking a process for transmitting the generated channel event message, and if a channel event message queue corresponding to an event transmitting request is not "FULL" of a previously-stored channel event message, transmitting the channel event message to a specific slave core to request for storing the channel event message; and returning a response of processing status to the request for storing the channel event message to the application program.

11 Claims, 11 Drawing Sheets

SYSTEM AND METHOD OF DYNAMICALLY LOADING AND EXECUTING MODULE DEVICES USING INTER-CORE-COMMUNICATION CHANNEL IN MULTICORE SYSTEM ENVIRONMENT

CROSS-REFERENCE TO RELATED APPLICATIONS

This application claims the priority of Korean Patent Application No. 10-2007-128988 filed on Dec. 12, 2007, in the Korean Intellectual Property Office, the disclosure of which is incorporated herein by reference.

BACKGROUND OF THE INVENTION

1. Field of the Invention

The present invention relates to a system and method for load balancing in a multicore system environment, and more particularly, to a system and method of allowing a master core to dynamically load, delete, or execute a driver of a module device on specific slave cores in the multicore system environment.

This work was supported by the IT/R&D program of the MIC/IITA [2006-S-038-02: Development of Device-Adaptive Embedded Operating System for Mobile Convergence Computing]

2. Description of the Related Art

Recently, load balancing technologies have been actively researched. In the load balancing technologies, operating systems (OSs) are executed on multiple core central processing units (CPUs), and jobs are suitably distributed over the multiple core CPUs in a multicore system environment for sharing information through a shared memory, so that performance and utilization of the multiple cores can be improved.

The load balancing technologies are classified into three multi-processing schemes of an asymmetric multi-processing (AMP) scheme, a symmetric multi-processing (SMP) scheme, and a bounding multi-processing (BMP) scheme. The AMP scheme is also classified into a homogenous AMP scheme, and a heterogeneous AMP scheme. In the homogenous AMP scheme, the same-type OSs are loaded on different multicore CPUs, but the OSs are independently executed. In the heterogeneous AMP scheme, different-type OSs are loaded and executed on different multicore CPUs.

In SMP scheme, a single OS is loaded on a main core, and the main core manages the other cores simultaneously. Application programs are allowed to be executed on any one of the cores. That is, in the SMP scheme, a single OS scheduler manages jobs of all the cores.

In the BMP scheme, similarly to the SMP, a single OS manages all the cores simultaneously. However, cores of performing a system initialization and specific application programs are fixed in advance.

The BMP scheme is provided so as to solve a problem of the SMP scheme in that the SMP scheme cannot improve performance by employing an application program produced in a single system environment as an application program for a multicore system environment. The BMP scheme is a core locking technology. That is, the system initialization is executed in a core where the OS scheduler exists, application programs are distributed to the other cores, and a specific application program is executed on only a specific cores.

Now, advantages and disadvantages of the three schemes will be described. The SMP scheme is suitable for a large-capacity database service since the number of cores can be easily increased. However, the SMP scheme is not a best solution to an embedded terminal apparatus for specific-purpose computing, such as a mobile phone or a personal data assistant (PDA) since large resources may be consumed.

The AMP scheme is suitable for the embedded terminal apparatus such as a mobile phone or a PDA. That is, a master core is implemented with a high-price, high-performance core, and slave cores are implemented with low-price, low-performance cores, so that optimized functions can be configured. However, since OSs need to be provided to all the cores, the AMP scheme has a problem in terms of unified system status management and extensibility in comparison with the SMP scheme.

Conventional load balancing schemes using multicore manages a single master core for performing general functions and a plurality of specific-purpose dedicated cores, that is, fixed the single master core.

That is, similarly to a multi-processor using a single main CPU and a plurality of digital signal processors (DSPs), in the multicore CPU, the master core is provided to a main CPU, and the specific-purpose dedicated, fixed cores are used like the DSPs.

Now, the conventional load balancing system and method using multicore will be described in detail with reference to FIGS. 1 and 2.

Figure 1:
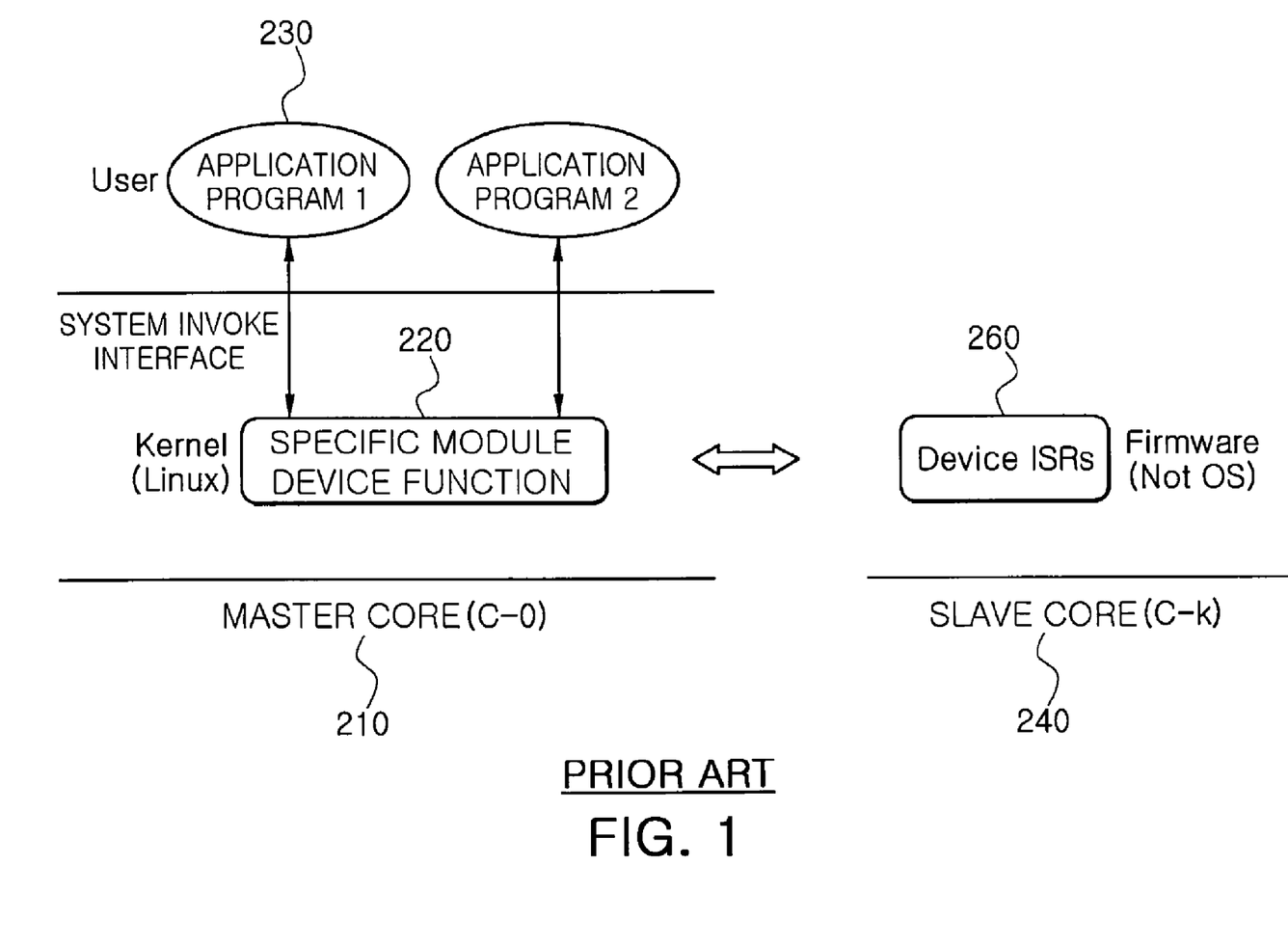
FIG. 1 is a view illustrating a configuration of an inter-module interface according to a conventional method.
Figure 2:
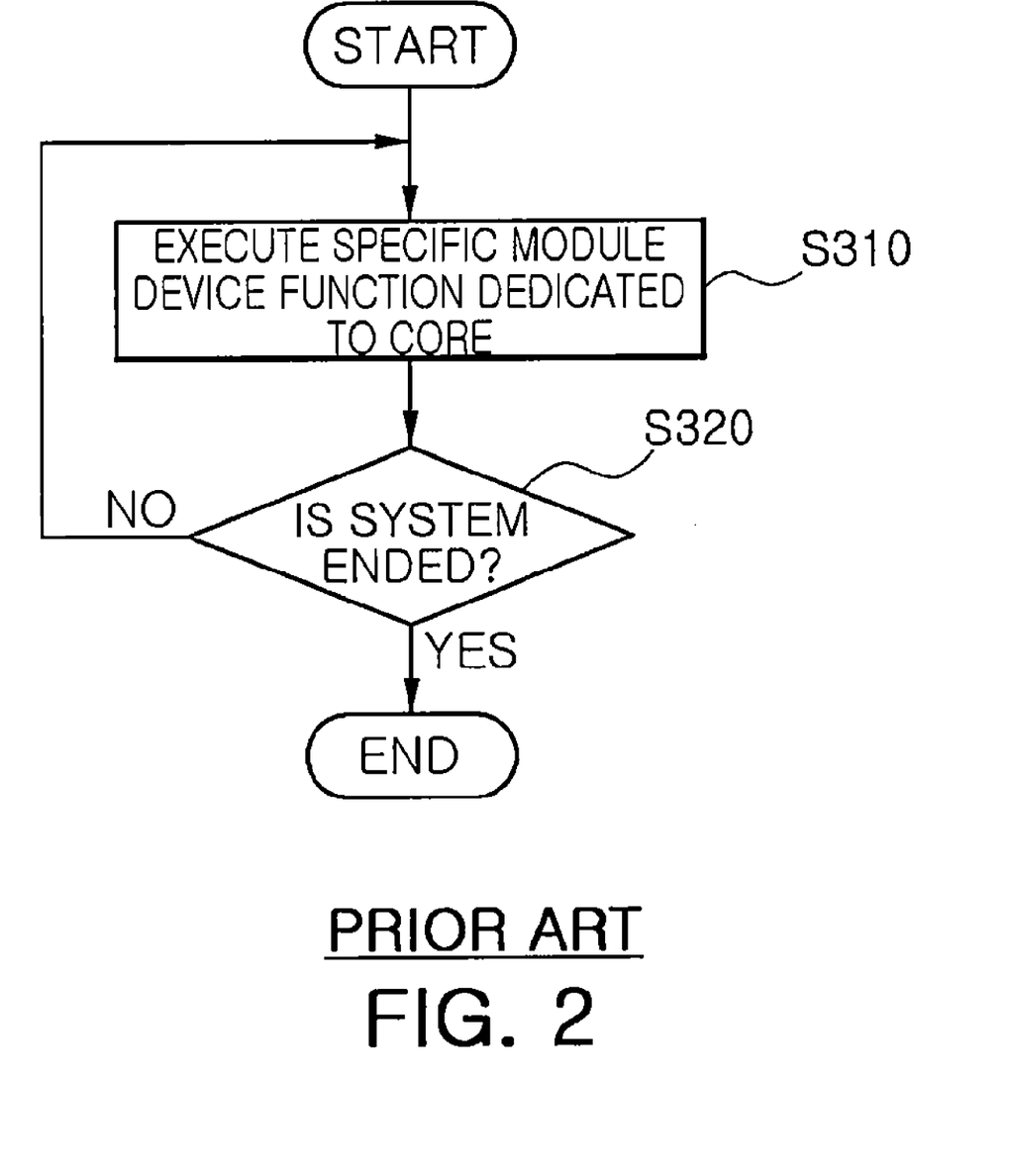
FIG. 2 is a flowchart illustrating operations of invoking and executing only functions of a module device embedded in a specific slave core according to a convention method.

Referring to FIGS. 1 and 2, in the conventional load balancing system and method using multicore, a master core 210 invokes a specific module device function 220, that is, a dedicated function in a kernel level of an inter-core OS and executes the specific module device function 220.

Functions 260 of module devices for performing specific functions among dedicated functions such as the specific module device function 220 are statistically embedded to slave cores 250 like firmware.

The master core 210 invokes functions of a module device (for performing specific functions needed by an application program 1 or an application program 2) from a slave core 250 through a system invoking interface and executes the functions (S310).

For example, in a case where a media player codec is embedded to the slave core in a firmware format, the application program of the master core use the media player codec invoked through the system invoking interface between the cores.

When execution of the specific function is completed in the application program, the system is ended (S320).

In the conventional balancing scheme, since the cores are used to be dedicated to only the specific functions, the functions that are not required by the application program may occupy the cores. Therefore, there is a problem in that utilization of core resources is lowered.

In addition, in the conventional balancing scheme, in a case where a slave core is not embedded with a module device function that is required by the application program of the master core, the module device function cannot be added and executed.

In addition, in the conventional load balancing scheme, since the application programs uses only one core without an OS scheduler, there is a problem of deterioration in parallelability and utilization.

That is, in a multicore system environment configured with the conventional load balancing scheme using multicore, in a case where a function other than the functions allocated to the cores is to be used, the parallelability, that is, the advantage of the multicore cannot be suitably utilized, so that performance of the entire system is deteriorated.

In the multicore system environment, the efficient utilization of the multicore is very important. However, for the aforementioned reasons, it is difficult to implement an asymmetric multicore structure capable of improving performance and reducing power consumption by simply allocating specific functions to the cores.

SUMMARY OF THE INVENTION

The present invention provides a system and method for dynamically loading, deleting, and periodically or non-periodically executing module device drivers on a specific slave core by using an inter-core-communication (ICC) channel in an asymmetric multicore system environment where different or the same operating systems are loaded and executed on different processor cores.

According to an aspect of the present invention, there is provided a method of dynamically loading and executing a module device of a master core using an ICC channel in a multicore system environment including the master core and a plurality of slave cores, comprising: initializing message transmission times; generating an event for processing a instruction received from an application program and generating a channel event message from the event; checking a process for transmitting the generated channel event message, and if a channel event message queue corresponding to an event transmitting request is not "FULL" of a previously-stored channel event message, transmitting the channel event message to a specific slave core to request for storing the channel event message; and returning a response of processing status to the request for storing the channel event message to the application program.

In the above aspect of the present invention, the method may further comprise, if the channel event message queue corresponding to the event transmitting request is "FULL" of the previously-stored channel event message, executing another process.

In addition, the returning of the response of processing status to the request for storing the channel event message to the application program may comprise: if the processing status to the request for storing the channel event message is normal, returning a response representing that the message transmission status is normal, and if the processing status is abnormal, re-transmitting the channel event message to the specific slave core; and checking the re-transmission times and, if the re-transmission times of the message is larger than or equal to a threshold value, returning a response representing that the message transmission status is abnormal.

In addition, the event may be one of a module device loading event for registering the module device in the specific slave core, a module device executing event for executing functions of the module device loaded on the specific slave core, and a module device deleting event for deleting the module device if the module device is not needed for the specific slave core.

According to another aspect of the present invention, there is provided a method of dynamically loading and executing a module device of a specific slave core using an ICC channel in a multicore system environment including a master core and a plurality of slave cores, comprising: receiving a channel event message generated by the master core through the ICC channel in order to process a instruction received from an application program; storing the channel event message in a channel event message queue; an event handler of the specific slave core interpreting the stored channel event message and executing one of a module device loading process, a module device executing process, and a module device deleting process.

In the above aspect of the present invention, the storing of the channel event message in the channel event message queue may comprise: initializing a system environment of a communication driver between multicore internal processes provided to the ICC channel; checking whether or not a message queueing event exist in the communication driver between the multicore internal processes, storing the channel event message in the channel event message queue if the message queueing event exist, and executing another process if the message queueing event does not exist.

In addition, the storing of the channel event message in the channel event message queue may further comprise: checking the message queueing status in the communication driver between the multicore internal processes, if the message queueing status is normal, transmitting a normal response message to the master core, and if the message queueing status is abnormal, transmitting an abnormal response message to the master core.

In addition, the module device loading process may comprise: the event handler fetching an object code from an OS kernel of the specific slave core and loading the object code on a memory; linking a code of the module device loaded on the memory and a kernel code with reference to a kernel symbol table; and invoking a predefined initialization function of the linked module device and storing the initialization function in a device driver list of the kernel.

In addition, the module device executing process may comprise: the event handler interpreting the channel event message; if the interpreted type of the message is a periodic message, a periodic event handler being invoked by an interrupt of a timer, and the periodic event handler fetching a channel event message from a periodic event message queue and interpreting the channel event message; opening a module device requested by the application program according to a result of the interpretation to obtain a file descriptor, invoking a function of the module device by using the file descriptor, and executing the function; if the execution of the function of the module device is completed, closing the module device to complete the module device execution; and if the module device execution is completed, registering the channel event message in the periodic event message queue in the order of periods.

In addition, if the interpreted type of the message is a non-periodic message, the module device executing process may comprise: interpreting the channel event message; opening the module device requested by the application program according to a result of the interpretation to obtained a file descriptor; invoking a function of the module device by using the file descriptor, and executing the function; and if the execution of the function of the module device is completed, closing the module device to complete the module device execution.

In addition, in the invoking of the function of the module device, if a type of the interpreted channel event message is a module device opening event, an open function is invoked, if the type is a module device closing event, a close function is invoked, if the type is a module device reading event, a read function is invoked, if the type is a module device writing event, a write function is invoked, and if the type is a module device control event, an ioctl function is invoked.

In addition, the module device deleting process may comprise: searching the module device in the device driver list of the kernel; invoking a module device release function from the kernel; and deleting the module device searched from the device driver list by using the module device release function.

According to still another aspect of the present invention, there is provided a system for dynamically loading and executing a module device using an ICC channel in a multicore system environment, comprising: a master core generating an event for requesting for a module device loading process, a module device deleting process, or a module device executing process requested by an application program, generating channel event message from the event, and transmitting the channel event message through the ICC channel; a plurality of slave cores performing the module device loading process, the module device deleting process, or the module device executing process according to the received channel event message.

In the above aspect of the present invention, the event may be one of a module device loading event for registering the module device in a specific slave core among the a plurality of slave cores, a module device executing event for executing functions of the module device loaded on the specific slave core, and a module device deleting event for deleting the module device if the module device is not needed for the specific slave core.

In addition, each of the master core and the slave cores may have the ICC channel including an ICC middleware and a multicore inter process communication (MC IPC) driver to communicate with each other.

In addition, each of the slave cores may comprise: an MC IPC driver storing the received channel event message in a channel event message queue; and an ICC middleware, wherein the ICC middleware comprises: an event handler interpreting the channel event message stored in the channel event message queue, executing one of the module device loading process, the module device deleting process, and the module device executing process if the channel event message is a non-periodic channel event message, and storing the channel event message in a periodic event message queue if the channel event message is a periodic channel event message; and a periodic event handler interpreting the periodic channel event message stored in the periodic event message queue and performing one of the module device loading process, the module device deleting process, and the module device executing process according to an predetermined interrupt of a timer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENT

Hereinafter, embodiments of the present invention will be described in detail with reference to the accompanying drawings so that the ordinarily skilled in the art can easily implement the embodiments.

However, in the detailed description of operational principles of the embodiments of the present invention, detailed description of well-known construction and operations will be omitted for clarifying the present invention.

In the specification, "connection between an element to another element" includes "indirect connection through still another element therebetween" as well as "direct connection therebetween".

In addition, "comprising an element" denotes not excluding other elements but further comprising other elements if there is no specific contrary description. The term "module" denotes a unitary one for performing a specific function or operation. The module may be implemented in a software manner, a hardware manner, or a combination of software and hardware.

In addition, in the drawings, elements having similar functions and operations are denoted by the same reference numerals.

Before the detailed description of the present invention, basic concepts associated with the present invention will be described as follows.

The present invention will be described by exemplifying an asymmetric multi-processing (AMP) environment having a connection structure wherein a plurality of slave cores are connected to a single master core in an AMP system suitable for an embedded device.

The connection structure can be easily extended to a 1:N structure having a peer-to-peer (P2P) relation between cores and an N:M structure having a peer-to-peer (P2P) relation between cores by integrating the 1:N structures, that is, integrating a master function and a slave function.

In addition, the present invention can be adapted to a symmetric multi-processing (SMP) system constructed with cores having the same level of computing power.

Figure 3:
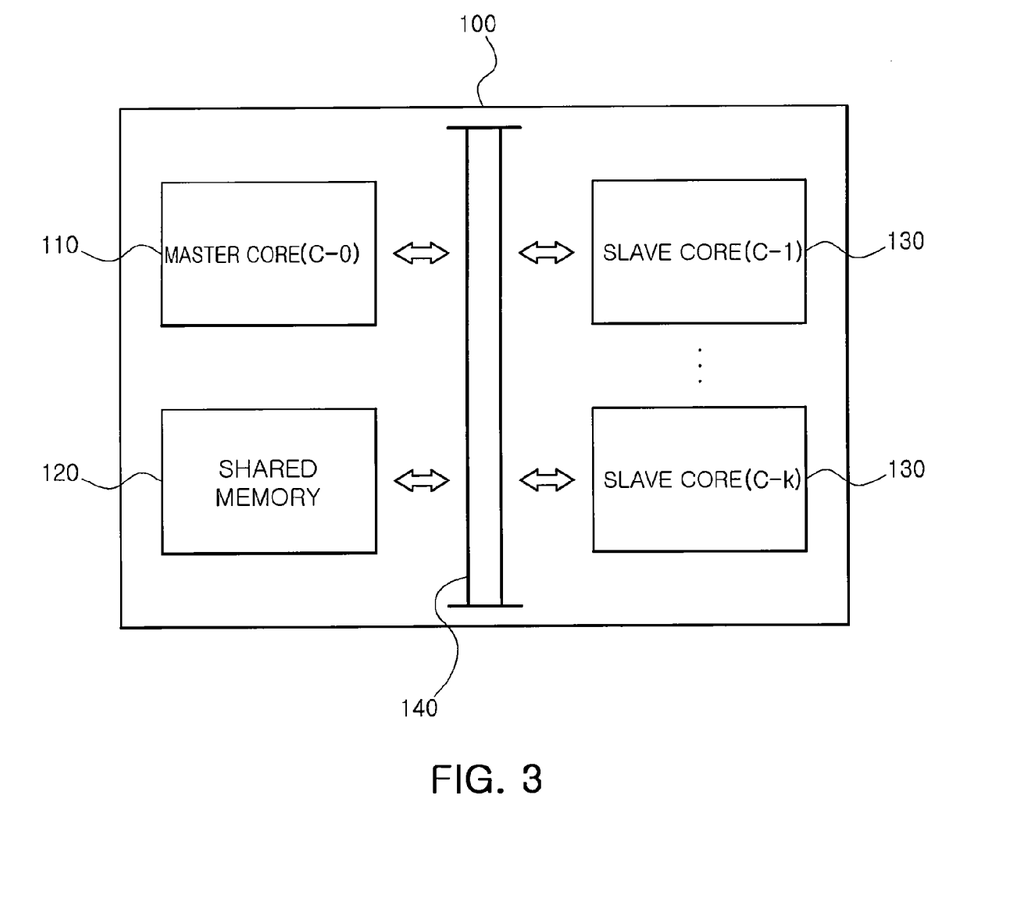
FIG. 3 is a view illustrating a hardware configuration of a multicore chip for implementing a system for dynamically loading and executing a module device by using an inter-core communication (ICC) channel in a multicore system environment according to an embodiment of the present invention.

FIG. 3 is a view illustrating a configuration of a multicore chip according to an embodiment of the present invention, in which a plurality of CPU cores can be simultaneously executed in a single chip processor package.

Referring to FIG. 3, a master core C-0 110 has large resources and many functions in terms of a CPU proceeding power, a memory protection function, and operating system (OS) software in comparison with slave cores (C-1) (130).

The a plurality of cores 110 and 130 shares data by using a shared memory 120, and communication between cores is performed through a control/data bus 140.

The master core (C-0) (110) transmits control instructions and data to the slave cores (C-1) (130) through the control/data bus (140) that is a shared resource.

Figure 4:
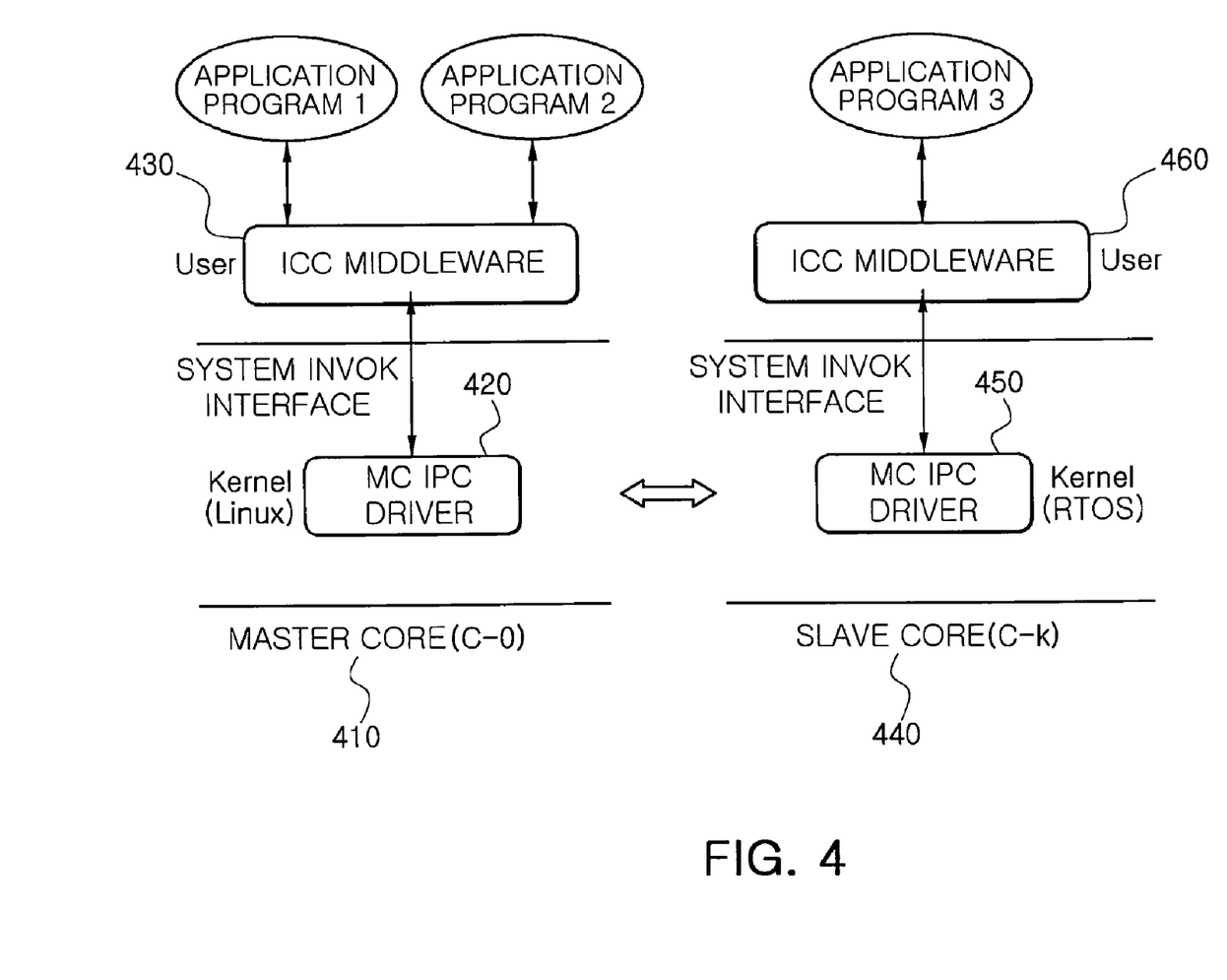
FIG. 4 is a view illustrating a system for dynamically loading and executing a module device by using an ICC channel in a multicore system environment according to an embodiment of the present invention.

FIG. 4 is a view illustrating a configuration of a system for dynamically loading and executing loading of a module device by using an inter-core communication (ICC) channel in a multicore system environment according to an embodiment of the present invention.

Referring to FIG. 4, the system according to the present invention includes a plurality of cores 410 and 440, each of which has an ICC channel module including user-level ICC middlewares 430 and 460 and kernel-level multicore inter-process communication (MC IPC) drivers 420 and 450.

The cores 410 and 440 are connected to each other through the ICC channel module. Components of the ICC channel module will be described later in detail with reference to FIG. 5.

Figure 5:
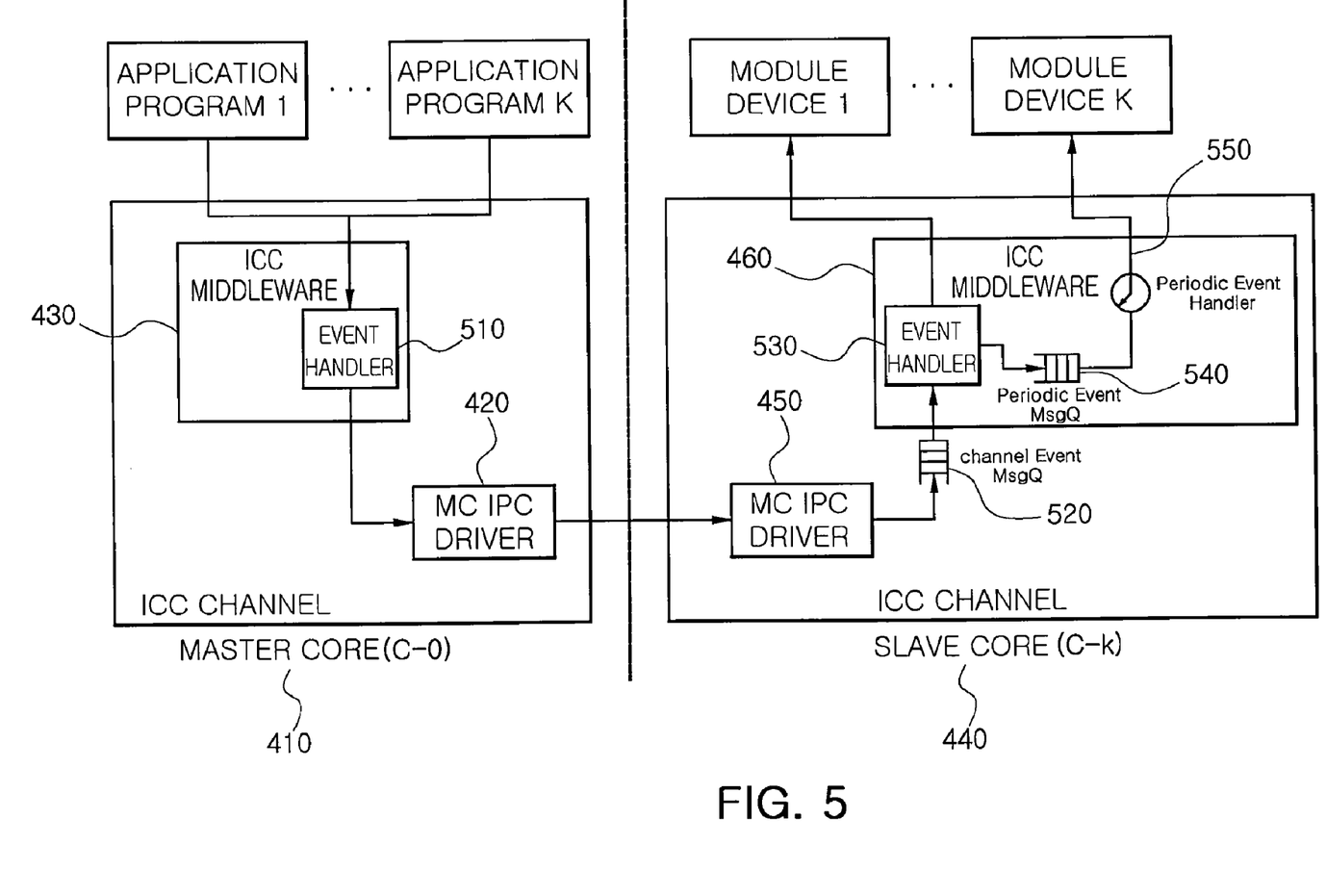
FIG. 5 is a view illustrating a detailed configuration of the ICC channel module shown in FIG. 4.

FIG. 5 is a view illustrating a detailed configuration of the ICC channel module in the system according to the present invention shown in FIG. 4. In the system according to the present invention, it is assumed that the master core (C-0) selects a specific slave core (C-k) from among a plurality of slave cores C-1, . . . , C-k.

As shown in FIG. 5, when the ICC middleware 430 of the master core (C-0) 410 receives a instruction, "Load media codec module device on slave core C-k 440" from one of an application program 1, . . . , and an application program k, an event handler 510 of the ICC middleware (430) of the master core (C-0) 410 generates an event for processing the instruction. Next, the event handler 510 generates a channel event message in order to transmit the event to the slave core (C-k) 440.

Next, the event handler 510 transmits the channel event message through the MC IPC driver (420) to the MC IPC driver 450 of the slave core (C-k) 440.

The MC IPC driver 450 of the slave core (C-k) 440 receives the channel event message and stores the channel event message in a channel event message queue 520.

The event handler 530 of the ICC middleware 460 of the slave core (C-k) 440 periodically monitors the channel event message queue 540 to check whether or not a channel event message is received.

If the channel event message is received, the event handler 530 interprets the channel event message. If the channel event message is a periodic message that is to be processed through a periodic interrupt of a timer (not shown), the event handler 530 stores the channel event message in a periodic event message queue 540. If the channel event message is a non-periodic message that is to be immediately processed, the event handler 530 invokes and executes an associated function of the module device.

For example, in a case where the event is the described-above event "Load media codec module device on slave core (C-k) 440", if the channel event message is a non-periodic message as a result of the interpretation, the event handler 530 immediately process a job of linking to a kernel and loading the module device of the kernel based on memory address and size information of the module device.

If the channel event message is a periodic message, the event handler 530 registers the channel event message in the periodic event message queue 540 of the slave core (C-k) 440. After that, if the registered channel event message is received, the periodic event handler 550 process the job of loading the module device according to the periodic interrupt of the timer (not shown).

Figure 6:
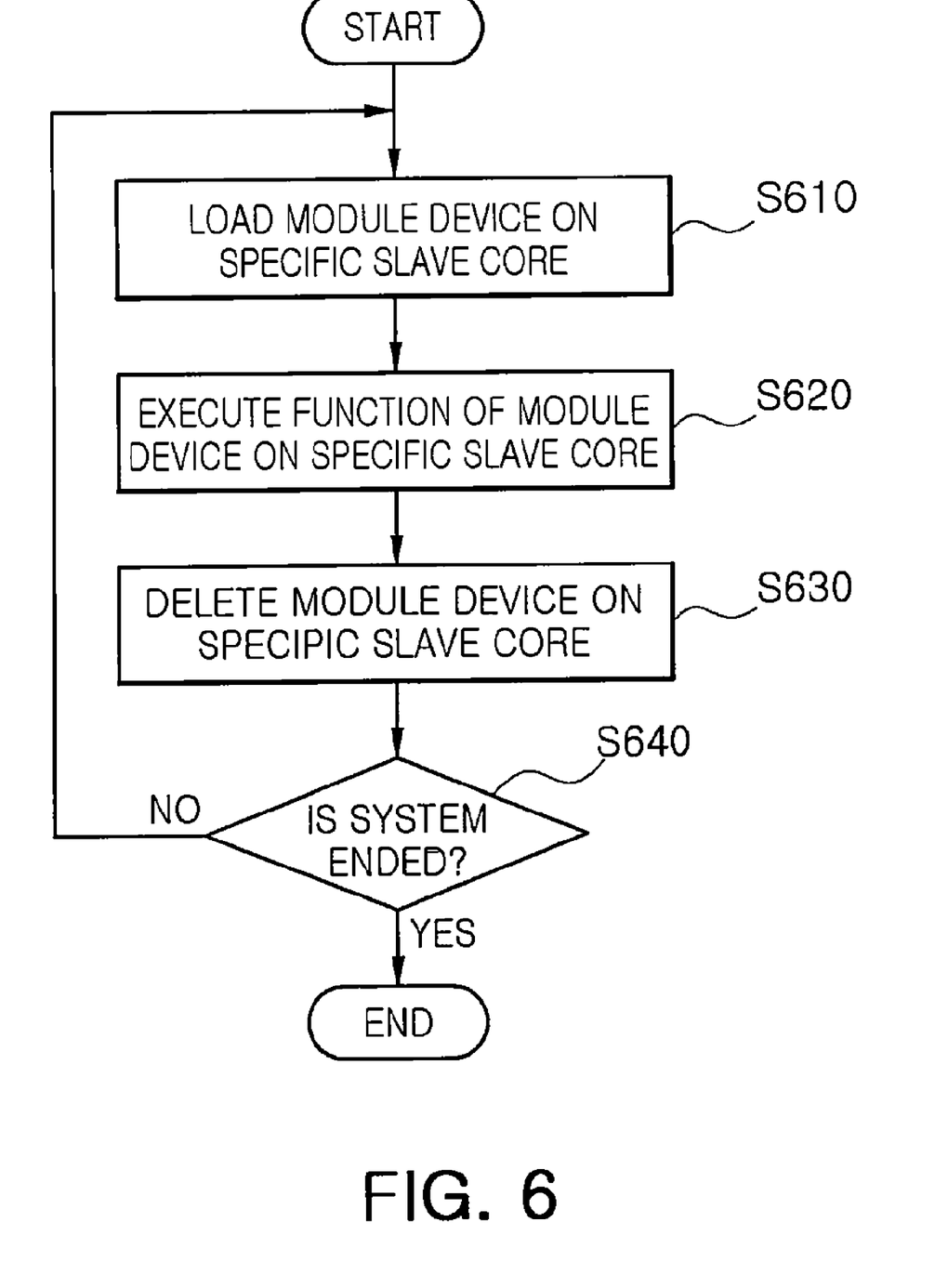
FIG. 6 is a flowchart illustrating a method of dynamically loading and executing a module device by using an ICC channel in a multicore system environment according to an embodiment of the present invention.

FIG. 6 is a flowchart of a method of dynamically loading and executing a module device by using an ICC channel in a multicore system environment according to an embodiment of the present invention.

Referring to FIG. 6, the method according to the present invention includes three operations, that is, a module device loading operation S610, a module device execution operation S620, and a module device deleting operation S630.

Firstly, in an AMP or SMP multicore system environment, the master core (C-0) 410 generates an event for processing an instruction received from an application program, generates a channel event message corresponding to the event, and transmits the channel event message through an ICC channel to a specific slave core (C-k) 440. The transmission of the channel event message is performed in each of the operations S610, S620, and S630.

When the channel event message is received, the specific slave core (C-k) 440 stores the channel event message and interprets the channel event message. If the channel event message is a module device loading event, the specific slave core (C-k) 440 performs loading the corresponding module device loading (S610).

After that, if a channel event message is received from the master core (C-0) 410 again, the specific slave core (C-k) 440 stores the channel event message and interprets the channel event message. As a result of the interpretation, if the channel event message is a module device executing event, the specific slave core (C-k) 440 executes a function of the loaded module device (S620).

After that, if a channel event message is received from the master core (C-0) 410 again, the specific slave core (C-k) 440 stores the channel event message and interprets the channel event message. As a result of the interpretation, if the channel event message is a module device deleting event, the specific slave core (C-k) 440 deletes the module device (S630).

The module device deleting event is an event generated by an application program when the module device is not needed by the specific slave core (C-k) 440.

When the job is completed, the system is ended. If another job is to proceed, the method returns to the operation S610 for loading a required module device on a specific slave core, and the following operations are repeated (S640).

Therefore, unlike the conventional scheme shown in FIGS. 1 and 2 where only the specific functions of the slave cores are statistically executed, in the present invention, the master core can dynamically load or delete the specific module device (required by an application program) on or from the specific slave core and execute functions of the specific module device.

In addition, according to the present invention, in the specific module device execution operation (S620), the functions of the module device loaded on the specific slave core can be periodically executed by the core or non-periodically executed according to occurrence of an interrupt. Therefore, it is possible to distribute execution of functions over the multicore.

Figure 7:
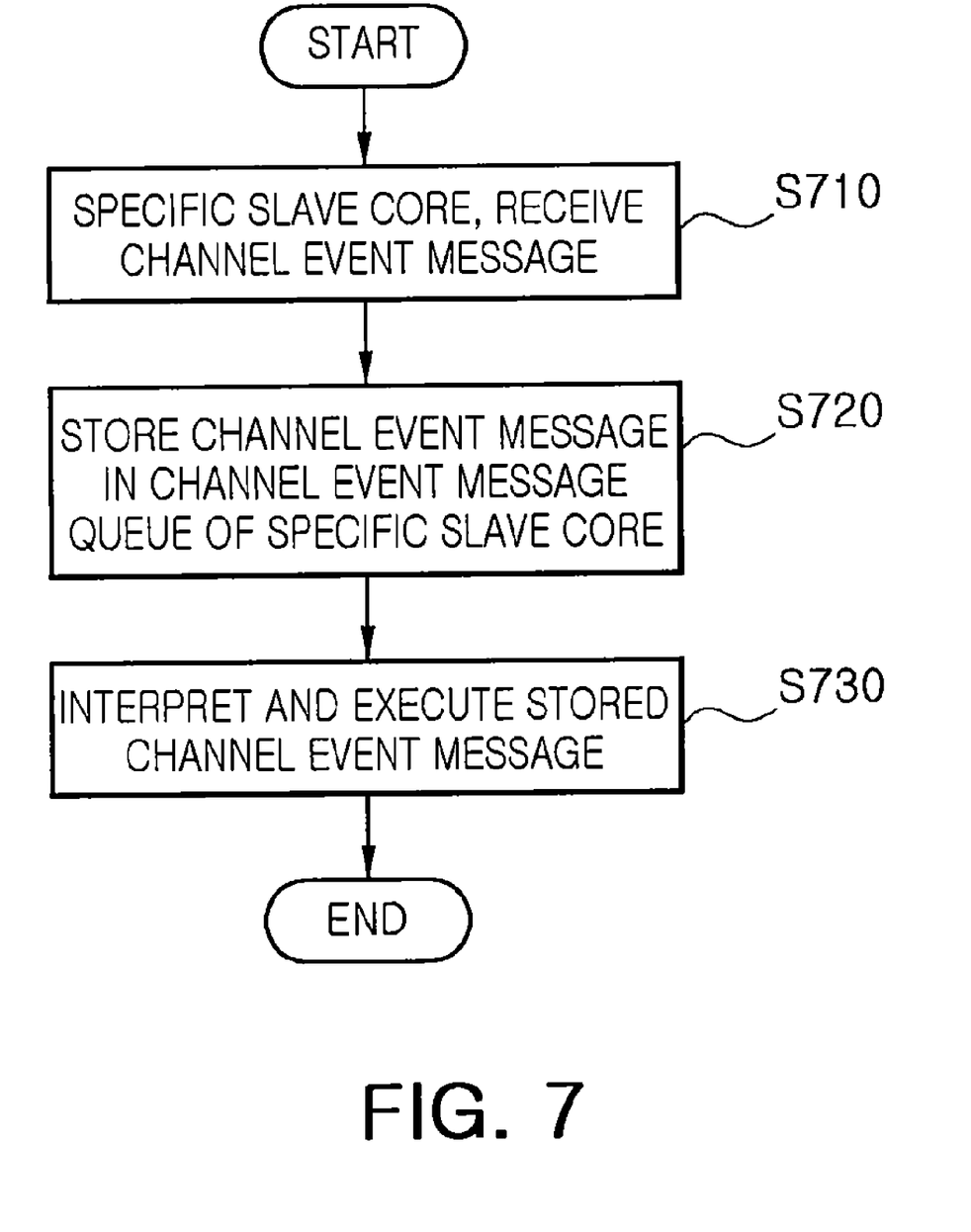
FIG. 7 is a flowchart illustrating operations in which a slave core performs processes on a channel event message, according to an embodiment of the present invention.

FIG. 7 illustrates a detailed flowchart of operations in which the slave core (C-k) 440 performs the module device loading process, the module device execution process, and the module device deleting process shown in FIG. 6.

Referring to FIG. 7, the specific slave core (C-k) 440 receives a channel event message from the master core (C-0) 410 (S710) and stores the channel event message in a channel event message queue 520 thereof (S720).

The channel event message includes one of the module device loading event, the module device executing event, and the module device deleting event.

Next, the event handler 530 of the specific slave core (C-k) 440 periodically checks the channel event message queue 520, fetches and interprets the stored channel event message, and executes the event according to a result of the interpretation (S730).

The operations S710 to S730 can be applied to each operation shown in FIG. 6. Firstly, in the module device loading process operation S610, the specific slave core (C-k) 440 receives the channel event message from the master core (C-0) 410 (S710).

Next, the specific slave core c-k 400 stores the received channel event message in the channel event message queue 520 thereof (S720).

The event handler 530 of the specific slave core (C-k) 440 interprets the channel event message. As a result of the interpretation, if the event is the module device loading event, the specific slave core actually performs the module device loading process (S730).

The module device loading event is an event for registering a module device in the specific slave core (C-k) 440. Due to the module device loading event, jobs which the master core (C-0) 410 is to perform can be distributed over the slave cores.

Secondly, in the module device executing process operation S620, in a state that the module device is loaded, the specific slave core (C-k) 440 receives the channel event message from the master core (C-0) 410 (S710).

Next, the MC IPC driver 450 of the specific slave core (C-k) 440 stores the received channel event message in the channel event message queue 520 thereof (S720).

The event handler 530 of the specific slave core (C-k) 440 interprets channel event message. As a result of the interpretation, if the event is the module device executing event, the specific slave core actually executes functions of the module device (S730).

Due to the module device executing event, if the module device is loaded on the specific slave core (C-k) 440, the specific slave core can execute the functions such as a read function, a write function, an open function, a close function, and an ioctl function by using the module device loaded on the specific slave core (C-k) 440.

Finally, in the module device deleting process operation S630, the specific slave core (C-k) 440 receives the channel event message from the master core (C-0) 410 (S710).

Next, the event handler 530 of the specific slave core (C-k) 440 stores the received channel event message in the channel event message queue 520 thereof (S720).

The event handler 530 of the specific slave core (C-k) 440 interprets the channel event message. As a result of the interpretation, if the event is the module device deleting event, the specific slave core actually deletes the module device (S730).

The module device deleting event is an event used in a case where the module device is no longer needed for the specific slave core. Due to the module device deleting event, resources of cores can be efficiently shared.

Figure 8:
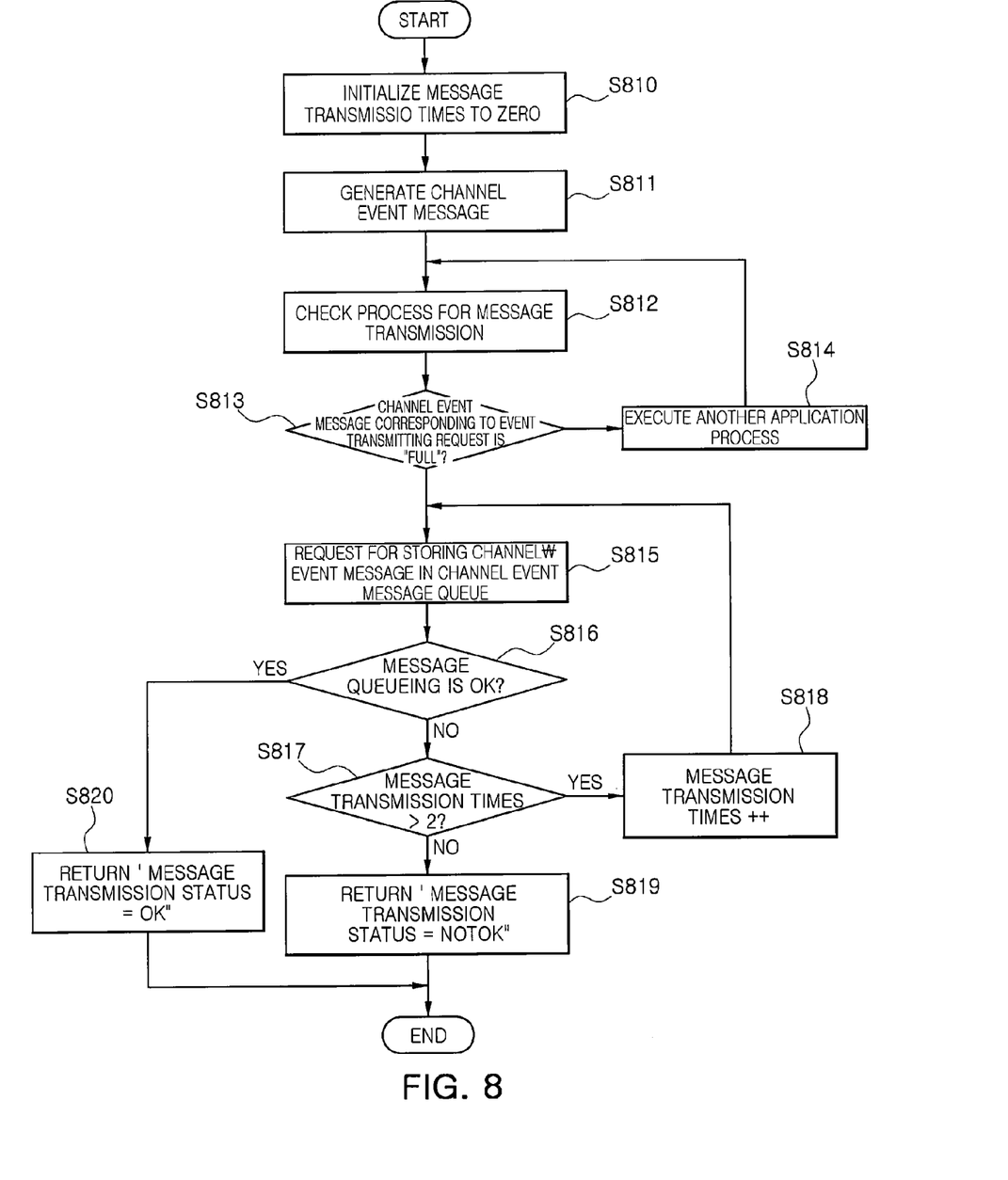
FIG. 8 is a flowchart illustrating operations in which a master core transmits a channel event message to a specific slave core through an ICC channel, according to an embodiment of the present invention.

FIG. 8 is a flowchart illustrating operations of the master core (C-0) 410 which transmits the module device loading event, the module device deleting event, or the module device executing event to selected specific slave cores (C-k) 440 through an ICC channel in a multicore system environment.

Referring to FIG. 8, firstly, an application program invokes an event transmitting function so as to transmit one of the module device loading event, the module device deleting event, or the module device executing event.

When the event transmitting function is invoked by the application program, the event handler 510 of the master core C-0 410 initializes the message transmission times to 0 (S810). The event handler 510 of the master core C-0 410 generates a to-be-transmitted event in a format of a channel event message (S811).

Next, the master core checks a process for transmitting the generated channel event message to the slave core (S812). As a result of the checking, if the channel event message queue 520 of the slave core associated with the request for transmitting the channel event message is "FULL" of a previously-stored channel event message (S813), the event handler of the master core executes another application process (S814).

If the channel event message queue 520 of the slave core associated with the request for transmitting the channel event message is not "FULL" of the previously stored channel event message (S813), the event handler 510 of the master core requests the specific slave core (C-k) 440 to store the channel event message in the channel event message queue 520 of the specific slave core (S815).

Next, if a message queueing job is available (OK) in the channel event message queue 520 of the slave core (S816), the event handler of the master core returns a response "message transmission status=OK" notifying that the message transmission succeeds to the invoking application program (S820) and ends the event transmitting function.

If the message queueing job is not available (NOTOK) (S816), the event handler of the master core repeats the message transmission twice to perform the aforementioned operation S815 (S817 and S818). In spite of the twice repetition of message transmission, if the message transmission does not succeed (S817), the event handler of the master core returns a response "message transmission status=NOTOK" to the application program (S819) and ends the event transmitting function.

Figure 9:
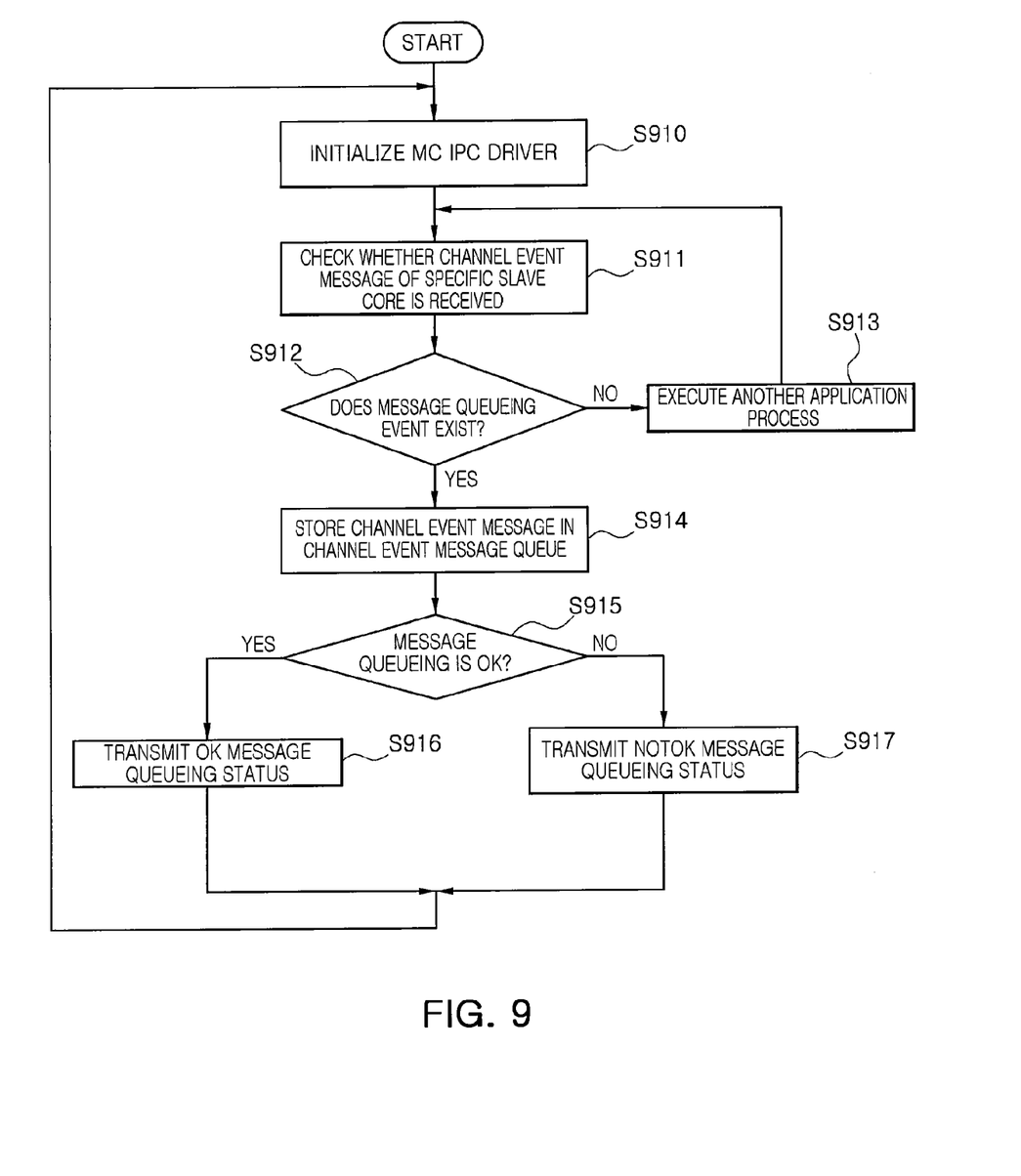
FIG. 9 is a flowchart illustrating operations in which a specific slave core stores a received channel event message in a channel event message queue thereof, according to an embodiment of the present invention.

FIG. 9 is a flowchart illustrating operations of the specific slave core (C-k) 440 which stores the channel event message received through the ICC channel in the channel event message queue 520 as shown in FIG. 8. The storing operations are performed by the MC IPC Driver 450.

Referring to FIG. 9, the MC IPC driver 450 initializes system environment variables (S910). Every time when an interrupt of a timer occurs, the MC IPC driver 450 periodically checks whether or not a channel event message is received (S911).

As a result of the checking, if a message queueing event notifying that a channel event message is received exists (S912), the MC IPC driver 450 stores the channel event message in the channel event message queue 520 (S914).

If the message queueing event does not exist (S912), the MC IPC driver 450 executes another application processor of the current slave core (C-k) 440 by using a scheduler of a kernel, that is, an operating system (S913). The MC IPC driver 450 checks again whether or not the channel event message of the slave core (C-k) 440 is received (S911).

If the message queueing job of the operation S914 of storing the channel event message in the channel event message queue 520 is performed normally (S915), the MC IPC driver 450 transmit an "OK" message to the master core C-0 410 (S916). If not (S915), the MC IPC driver 450 transmits an "NOTOK" message to the master core C-0 410 (S917).

Next, the MC IPC driver 450 initializes the system environment variables again (S910) and performs the aforementioned operations on the next-received channel event message.

Figure 10:
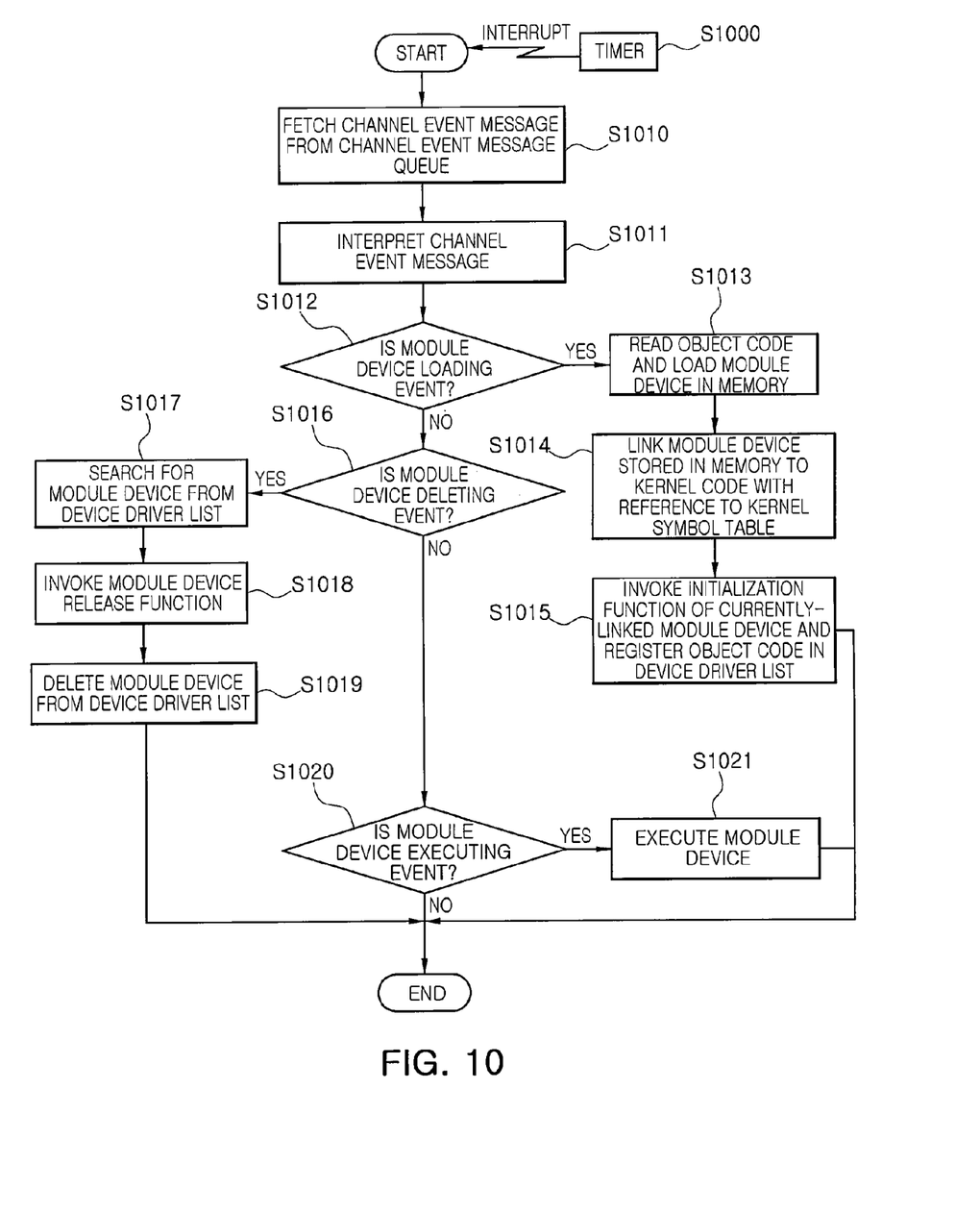
FIG. 10 is a flowchart illustrating operations in which a specific slave core fetches a channel event message from a channel event message queue, interprets the channel event message, and performs a module device loading process, a module device deleting process, or a module device executing process, according to an embodiment of the present invention.

FIG. 10 is a flowchart illustrating operations of the event handler 530 of the specific slave core (C-k) 440 which fetches a channel event message from the channel event message queue 520, interprets the channel event message, and actually performs one of the module device loading process, the module device deleting process, or the module device executing process. The operations are periodically performed every time when an interrupt of a timer occurs.

Referring to FIG. 10, the event handler 530 fetches a channel event message from the channel event message queue 520 (S1010) and interprets the channel event message (S1011). As a result of the interpretation, one of the module device loading process, the module device deleting process, and the module device executing process is performed according to a type of the event.

The event includes a module device loading event, a module device deleting event, and a module device executing event. In case of the module device loading event, a module device loading function for registering a user's module device as a device driver of a kernel is performed. In case of the module device deleting event, a module device deleting function for deleting the module device from a device driver list of the kernel so not to refer to the kernel is performed. In case of the module device executing event, a function of the loaded module device is executed.

As a result of the interpretation of the channel event message, if the event is a module device loading event (S1012), the event handler 530 directly invokes and stores an object code in a memory space by using a name, a size, and address information of the object code (S1013).

Next, the event handler 530 links a code of the module device stored in the memory to a code of the kernel with reference to a kernel symbol table (S1014). The linking job is a general shared library linking job for replacing a relative address of the module device stored in the memory with an absolute address in the kernel for registration.

Finally, the event handler 530 invokes an initialization function of the currently linked module device to register the current object code in the device driver list (S1015). The initialization function of the user's module device is a function created by the user. As a result, the job for registering the module device as a device driver in the kernel is completed.

The device driver is a device controlling function provided by the kernel, that is, an operating system. Therefore, generally, in a kernel-based system, a method of controlling the device by using the device driver is more efficient than a method of controlling the device by using only an application program. In addition, since the device driver is an internal function of the kernel, the device driver is closely associated with operations of the kernel.

If the event is a module device deleting event (S1016), the event handler 530 searches for eth associated module device registered in the device driver list (S1017). The kernel invokes a module device release function (S1018) and deletes the module device from the device driver list (S1019).

If the event is a module device executing event (S1020), the event handler 530 performs the module device executing process (S1021). The operations of the module device executing process will be described below in detail with reference FIG. 11.

Figure 11:
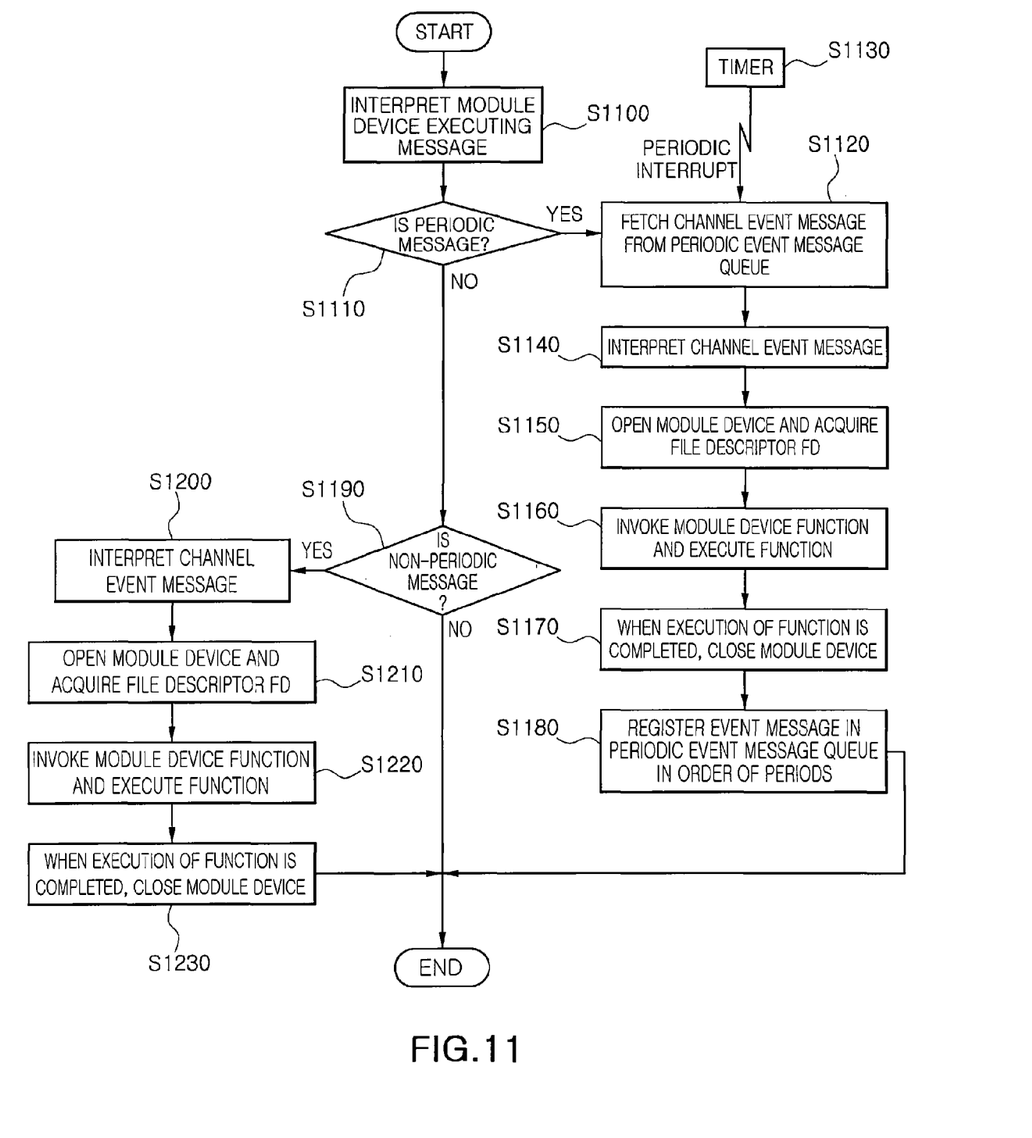
FIG. 11 is a flowchart illustrating operations in which a specific slave core periodically or non-periodically processes functions of a module device in the module device executing process shown in FIG. 10.

FIG. 11 is a detailed flowchart illustrating the operations of performing the module device executing process shown in FIG. 10.

Referring to FIG. 11, the event handler 530 of the specific slave core (C-k) 440 interprets the channel event message including the module device executing event fetched from the channel event message queue 520 (S1100).

As a result of the interpretation, if the channel event message is a periodic message that is to be processed according to a predetermined period (S1110), the periodic event handler 550 fetches the channel event message from the periodic event message queue 540 according to occurrence of an periodic interrupt of a timer (S1120) and interprets the channel event message (S1140). Next, the periodic event handler 550 opens a user's desired module device to acquire a file descriptor fd (S150).

The periodic event handler 520 is periodically invoked according to the occurrence of the interrupt of the timer so as to invoke a function of the module device from the periodic event message queue 540 in synchronization with the period of the timer.

The periodic event handler 520 invokes the function of the module device by using the file descriptor fd and executes the function (S1160). If the execution of the function of the module device is completed, the periodic event handler 520 closes the module device, so that the module device execution is completed (S1170).

Next, the periodic event handler 520 registers the channel event message in the periodic event message queue 540 in the order of periods, so that the entire operations are ended (S1180).

If the channel event message is a non-periodic message that is to be immediately processed (S1190), the event handler 530 interprets a type of the non-periodic event message fetched from the channel event message queue 520 (S1200). The event handler 530 opens the associated module device according to a result of the interpretation and acquires file descriptor fd (S1210).

The event handler 530 actually invokes a function of the module device by using the file descriptor fd and executes the function (S1220). If the execution of the function is completed, the event handler 530 closes the module device, so that the module device execution is completed (S1230).

Basic functions of the device driver are defined in advance. As an example of the basic functions, there are module device open/close functions, module device read/write functions, and a module control function.

The event handler 530 interprets the channel event message for the module device executing event. As a result of the interpretation, the event handler 530 invokes a function of the device driver according to a type of the message.

If the type of the message is a module device opening event or a module device closing event, the event handler 530 invokes an open function or a close function of the associated module device.

If the type of the message is a module device reading event or a module device writing event, the event handler 530 invokes a read function or a write function of the associated module device.

If the type of the message is a module device control event, the event handler 530 invokes an ioctl function of the associated module device.

The actually invoked open/close functions, read/write functions, and ioctl function are basic functions provided by the kernel. In the present invention, the functions provided by the kernel are used.

Therefore, as described above with reference to FIGS. 3 to 11, according to the present invention, functions can be dynamically allocated to cores in addition to the master core. That is, the master core corresponding to a main CPU is provided, and the other cores are not used as only dedicated cores such as DSP. If dedicated functions are needed for an application, the dedicated functions are dynamically allocated to or released from the other cores without a support of an operating-system scheduler.

Conventionally, specific cores are used as fixed cores such as a three-dimensional vector calculation core and an MPEG player core. However, as an example according to the present invention, if a three-dimensional vector calculation function and an MPEG player function are needed for an application, the three-dimensional vector calculation function is allocated to one core, and the MPEG player function is allocated to another core. When the execution of the functions is completed, the cores are released from the functions, so that the core resources can be utilized by other applications.

As another example according to the present invention, a media player codec device may be loaded on a core 1, and a MP3 codec device may be loaded on a core 2. Therefore, viewing of an MPEG4 video and storing of an audio file can be simultaneously performed. In addition, in the next usage, the MP3 codec device is unloaded from the core 2, and a Div decoder may be loaded on the core 2. Therefore, the viewing of the MPEG4 video and the viewing of the Div video can be simultaneously performed.

According to the present invention, it is possible to freely load, delete, or execute a module device on a specific slave core in a multicore system environment. In addition, different operating systems can be loaded on different cores by using a general-purpose ICC middleware technology, so that it is possible to implement easy portion and to efficiently use distributed core resources.

In addition, according to the present invention, it is possible to newly implement and use a core having a specific function needed for an application program without a support of an operating-system scheduler. In addition, required parallel functions can be allocated to the remaining cores without a support of the operating-system scheduler, so that it is possible to improve parallelability and to increase an efficiency of utilization of resources.

In addition, a system and method of loading, deleting, and executing the module device on a core can be utilized together with application-level quality-of-service (QoS) operating-system scheduler technology, so that it is possible to easily implement an embedded terminal system having a good QoS.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of dynamically loading and executing a module device of a specific slave core using an ICC (inter-core communication) channel in a multicore system environment including a master core and a plurality of slave cores, comprising:

receiving a channel event message generated by the master core through the ICC channel in order to process an instruction received from an application program;

storing the channel event message in a channel event message queue thereof; and an event handler of the specific slave core interpreting the stored channel event message and executing one of a module device loading process, a module device executing process, and a module device deleting process, wherein each slave core includes a second event handler configured to interpret channel event messages received from the master core via the ICC channel, and wherein the module device executing process comprises:

the event handler interpreting the channel event message;

if the interpreted type of the message is a periodic message, a periodic event handler being invoked by an interrupt of a timer, and the periodic event handler fetching a channel event message from a periodic event message queue and interpreting the channel event message;

opening a module device requested by the application program according to a result of the interpretation to obtain a file descriptor, invoking a function of the module device by using the file descriptor, and executing the function;

if the execution of the function of the module device is completed, closing the module device to complete the module device execution; and if the module device execution is completed, registering the channel event message in the periodic event message queue in the order of periods.

2. The method of claim 1, wherein the storing of the channel event message in the channel event message queue comprises:

initializing a system environment of a communication driver between multicore internal processes provided to the ICC channel; and checking whether or not a message queueing event exist in the communication driver between the multicore internal processes, storing the channel event message in the channel event message queue if the message queueing event exist, and executing another process if the message queueing event does not exist.

3. The method of claim 2, wherein the storing of the channel event message in the channel event message queue further comprises checking the message queueing status in the communication driver between the multicore internal processes, if the message queueing status is normal, transmitting a normal response message to the master core, and if the message queueing status is abnormal, transmitting an abnormal response message to the master core.

4. The method of claim 1, wherein the module device loading process comprises:

the event handler fetching an object code from an OS kernel of the specific slave core and loading the object code on a memory;

linking a code of the module device loaded on the memory and a kernel code with reference to a kernel symbol table; and invoking a predefined initialization function of the linked module device and storing the initialization function in a device driver list of the kernel.

5. The method of claim 1, wherein, if the interpreted type of the message is a non-periodic message, the module device executing process comprises:

interpreting the channel event message;

opening the module device requested by the application program according to a result of the interpretation to obtained a file descriptor;

invoking a function of the module device by using the file descriptor, and executing the function; and if the execution of the function of the module device is completed, closing the module device to complete the module device execution.

6. The method of claim 1, wherein in the invoking of the function of the module device, if a type of the interpreted channel event message is a module device opening event, an open function is invoked, if the type is a module device closing event, a close function is invoked, if the type is a module device reading event, a read function is invoked, if the type is a module device writing event, a write function is invoked, and if the type is a module device control event, an ioctl function is invoked.

7. The method of claim 1, wherein the module device deleting process comprises:
   searching the module device in the device driver list of the kernel;
   invoking a module device release function from the kernel; and
   deleting the module device searched from the device driver list by using the module device release function.

8. A packaged processor having a system for dynamically loading and executing a module device using an ICC (inter-core communication) channel in a multicore system environment, the packaged processor comprising:
   a master core having a first event handler configured to generate an event for requesting a module device loading process, a module device deleting process, or a module device executing process according to a request received from an application program, generate a channel event message from the event, and transmit the channel event message via the ICC channel; and
   the plurality of slave cores configured receive channel event messages from the master core via the ICC channel and perform any of the module device loading process, the module device deleting process, and the module device executing process according to the channel event messages received from the master core,
   wherein each slave core includes a second event handler configured to interpret channel event messages received from the master core via the ICC channel,
   wherein each of the slave cores comprises:
      an MC IPC (multicore inter process communication) driver storing the received channel event message in a channel event message queue; and
      an ICC middleware,
   wherein the ICC middleware comprises:
      the event handler configured to interpret the channel event message stored in the channel event message queue, execute any of the module device loading process, the module device deleting process, and the module device executing process if the channel event message is a non-periodic channel event message, and store the channel event message in a periodic event message queue if the channel event message is a periodic channel event message; and
      a periodic event handler configured to interpret the periodic channel event message stored in the periodic event message queue and perform any of the module device loading process, the module device deleting process, and the module device executing process according to an predetermined interrupt of a timer.

9. The packaged processor of claim 8, wherein each of the slave core is configured to handle the module device loading event for registering a module device, a module device executing event for executing functions of a module device loaded on the slave core, and a module device deleting event for deleting a module device loaded on the slave core.

10. The packaged processor of claim 8, wherein each of the master core and the slave cores has the ICC channel including an ICC middleware and an MC IPC (multicore inter process communication) driver to communicate with each other.

11. The packaged processor of claim 8, further comprising:
   a bus shared by the master core and the slave cores; and
   a memory shared by the master core and the slave cores.

* * * * *